US012616873B2

(12) United States Patent
Herbert

(10) Patent No.: US 12,616,873 B2
(45) Date of Patent: May 5, 2026

(54) MANDIBULAR ADVANCEMENT DEVICE

(71) Applicant: Cynthia Herbert, Parrish, FL (US)

(72) Inventor: Cynthia Herbert, Parrish, FL (US)

(73) Assignee: MANDITRAC, LLC, Parrish, FL (US)

( * ) Notice: Subject to any disclaimer, the term of this patent is extended or adjusted under 35 U.S.C. 154(b) by 591 days.

(21) Appl. No.: 17/875,389

(22) Filed: Jul. 27, 2022

(65) Prior Publication Data

US 2023/0031570 A1 Feb. 2, 2023

Related U.S. Application Data

(60) Provisional application No. 63/225,979, filed on Jul. 27, 2021.

(51) Int. Cl.
*A63B 23/03* (2006.01)
*A61C 7/08* (2006.01)

(52) U.S. Cl.
CPC .............. *A63B 23/032* (2013.01); *A61C 7/08* (2013.01)

(58) Field of Classification Search
CPC ..... A63B 23/032; A63B 23/025; A63B 23/03; A63B 23/18; A61C 7/08; A46B 9/04; A46B 9/045; A46B 11/0003; A46B 15/0071; A46B 2200/1066; A46B 2200/1073; A46B 2200/108; A46B 2200/1086
USPC ............................................ 482/11; 128/848
See application file for complete search history.

(56) References Cited

U.S. PATENT DOCUMENTS

| | | | | |
|---|---|---|---|---|
| 1,389,436 A * | 8/1921 | Cameron | .................. | A61B 1/24 |
| | | | | 600/219 |
| 3,528,655 A * | 9/1970 | Ruderian | ............. | A63B 23/032 |
| | | | | 482/11 |
| 3,744,485 A * | 7/1973 | Worthy | ................ | A63B 23/032 |
| | | | | 482/11 |
| 5,556,357 A * | 9/1996 | Hanna | .................. | A63B 23/032 |
| | | | | 601/39 |
| 5,577,983 A * | 11/1996 | Fraser | .................. | A63B 23/032 |
| | | | | 433/140 |
| 6,436,034 B1 * | 8/2002 | Funatogawa | ........ | A63B 23/032 |
| | | | | 433/7 |
| 7,134,986 B2 * | 11/2006 | Tiberio | ................ | A63B 23/032 |
| | | | | 482/93 |
| 7,462,132 B2 * | 12/2008 | Kuehne | ................ | A63B 23/032 |
| | | | | 482/11 |

(Continued)

OTHER PUBLICATIONS

DynaFlex, "MandiTrac", retrieved from the internet on Mar. 10, 2025, https://www.dynaflex.com/manditrac/?srsltid= AfmBOor7WsaRzPkGQ6eU324CVf3m2xgKpPffqQ-HxLDzlilv9fbU70BD (Year: 2022).*

*Primary Examiner* — Megan Anderson
*Assistant Examiner* — Kathleen M Fisk
(74) *Attorney, Agent, or Firm* — Traverse Legal, PLC

(57) ABSTRACT

A mandibular advancement device for stabilizing and exercising muscles that support the human jaw and for improving chewing and biting function. The mandibular advancement device includes a base portion and two curved members extending outwardly from the base portion to form a generally arched-type shape. The device also includes two axles wherein each axle extends inwardly from a portion of each of the curved members. The device also includes two rollers, wherein each of the rollers is slidably disposed upon each of the axles for engagement by human teeth to achieve mandibular advancement.

15 Claims, 4 Drawing Sheets

(56) References Cited

U.S. PATENT DOCUMENTS

|  |  |  |  |  |
|---|---|---|---|---|
| 8,172,725 B2* | 5/2012 | Boutenko | ............. | A63B 21/05 |
|  |  |  |  | 482/121 |
| 9,192,812 B2 | 11/2015 | Li |  |  |
| 9,204,991 B1* | 12/2015 | Harkins | .................. | A61F 5/566 |
| 10,376,202 B2 | 8/2019 | Shah |  |  |
| 11,420,094 B2* | 8/2022 | Gaboriault | ............. | A47G 21/02 |
| 2010/0056342 A1* | 3/2010 | Loveday | ................ | A63B 23/03 |
|  |  |  |  | 482/11 |
| 2010/0190611 A1* | 7/2010 | Machida | .............. | A63B 21/028 |
|  |  |  |  | 482/11 |
| 2014/0094346 A1* | 4/2014 | Brown | ................ | A63B 71/085 |
|  |  |  |  | 482/11 |
| 2014/0224260 A1* | 8/2014 | Frey | .......................... | A61F 5/56 |
|  |  |  |  | 128/848 |
| 2020/0197655 A1 | 6/2020 | Shelly |  |  |
| 2021/0085514 A1 | 3/2021 | Flaherty |  |  |
| 2021/0145630 A1 | 5/2021 | Ghuge |  |  |
| 2023/0293938 A1* | 9/2023 | Younane | ............ | A63B 21/0421 |
|  |  |  |  | 482/11 |

* cited by examiner

MANDIBULAR ADVANCEMENT DEVICE

FIELD

The present disclosure generally relates to a mandibular advancement device for stabilizing and exercising muscles that support the jaw and for improving chewing function.

BACKGROUND

Individuals regularly place much wear and tear on their jaws, which causes damage to their teeth, joints, and muscles. They can also suffer from serious medical conditions, such as Temporomandibular joint disorder (TMJD), due to a lack of muscular structure in their jaws. TMJD refers to acute or chronic inflammation of the temporomandibular joint, which connects the mandibular jaw to the skull.

Exercises of jaw and other facial muscles is a recommended manner to help avoid, reverse, or at least delay the onset of various ailments and medical conditions, such as TMJ disorders. Supporting muscles of the jaw, such as the lateral pterygoid muscle and masseter muscle, and of the tongue, such as the genioglossus muscle, should be regularly exercised, but are often overlooked.

Existing devices used for exercising a jaw have several shortcomings since they are typically custom fit for individuals and limited in their specific uses/applications. So, if an individual loses the device, it can be difficult to remake it at the individual's natural bite position. Also, existing devices are often uncomfortable for an individual to insert into the mouth and/or cause strains on an individual's jaw muscles. Some existing devices result in changes in an individual's natural bite since the individual's mandible is pulled forward and down during the night.

Consequently, there is a need for a single device that can target the main muscles that support an individual's jaw and improving chewing and biting function, while preventing bite changes and yet being customizable and comfortable.

BRIEF SUMMARY

What is provided is a mandibular advancement device for stabilizing and exercising muscles that support the jaw and for improving chewing and biting function. The device is comfortable, user-friendly, and does not change a user's bite.

In one embodiment, the mandibular advancement device includes a base portion and first and second curved members extending outwardly from the base portion to form first and second ends of the first and second curved members, respectively. The mandibular advancement device also includes first and second axles that extend inwardly from the first and second ends of the first and second curved members, respectively. In one embodiment, the mandibular advancement device further includes first and second rollers that slidably engage the first end second axles.

BRIEF DESCRIPTION OF THE DRAWINGS

The above, as well as other advantages of the present disclosure, will become readily apparent to those skilled in the art from the following detailed description when considered in light of the accompanying drawings in which.

DETAILED DESCRIPTION

Figure 1:
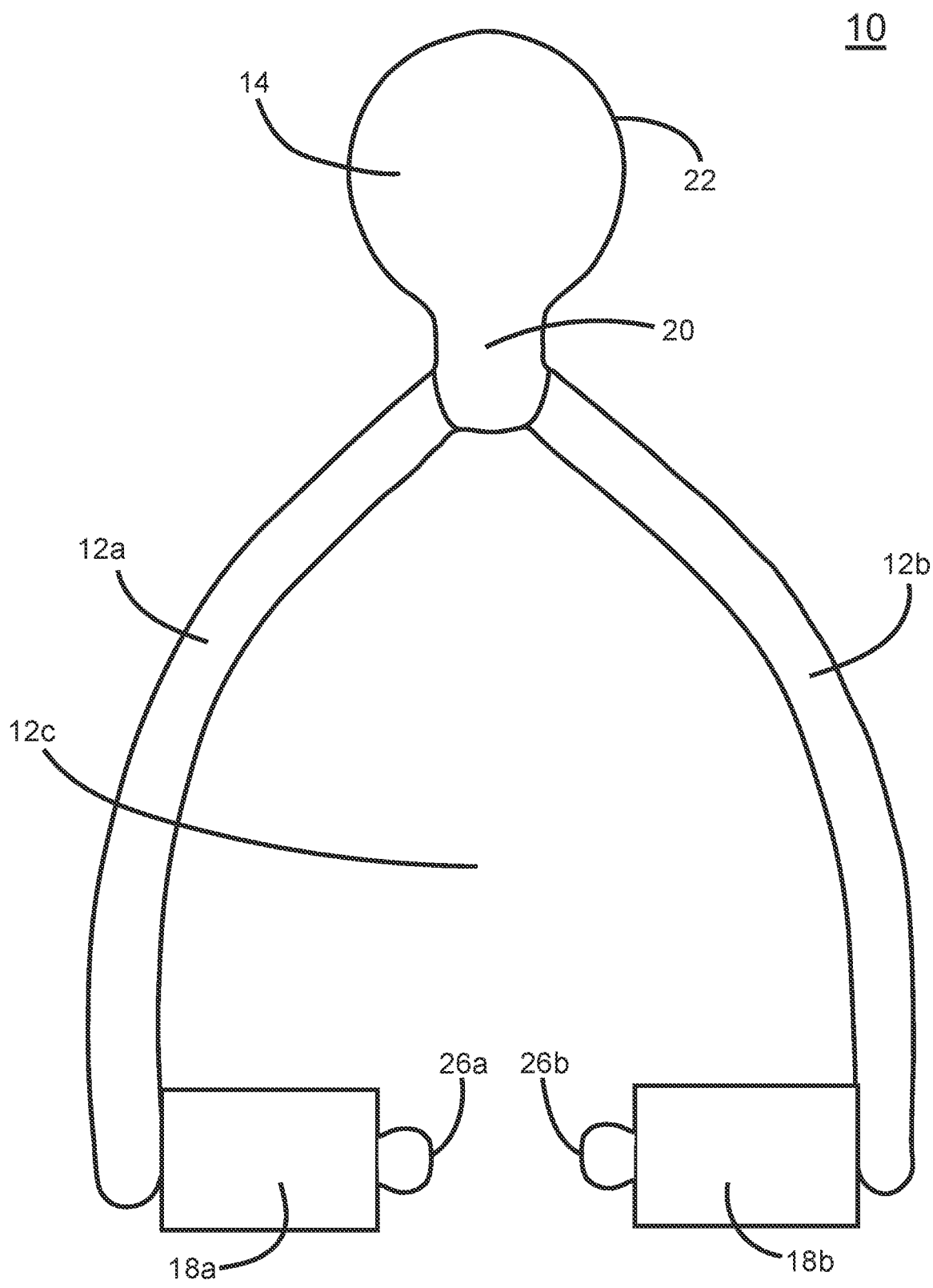
FIG. 1 illustrates a perspective view of a mandibular advancement device including rollers according to one embodiment of the disclosure.

It is to be understood that the disclosure may assume various alternative orientations and step sequences, except where expressly specified to the contrary. It is also understood that the specific devices and processes illustrated in the attached drawings and described in the specification are simply exemplary embodiments of the inventive concepts disclosed and defined herein. Hence, specific dimensions, directions or other physical characteristics relating to the various embodiments disclosed are not to be considered as limiting unless expressly stated otherwise.

The following is a list of elements that are referenced in FIGS. 1-4 and in this Detailed Description:

- 10 mandibular advancement device
- 12a, 12b curved members
- 12c opening between curved members 12a, 12b
- 14 base portion
- 16a, 16b axles (bars)
- 18a, 18b rollers
- 18c, 18d axes
- 18e, 18f roller axial openings
- 20 neck portion
- 22 circular portion
- 24a, 24b elongated portions
- 26a, 26b rounded portions FIGS. 1-4 are views of a mandibular advancement device 10 according to an embodiment of the present disclosure. The "mandibular" (also called the "mandible") is a jawbone. One purpose of the disclosed mandibular advancement device 10 is to move the jawbone (i.e. advance the jawbone) forward. Mandibular advancement device 10 exhibits a substantially arch-shape, for example a generally wishbone-like shape, in one embodiment. Mandibular advancement device 10 includes two extending and curved members 12a and 12b and a base portion 14. Mandibular advancement device 10 also includes two axles (i.e. bars) 16a and 16b (FIG. 4) extending inwardly from two curved members 12a and 12b. Returning to FIG. 1, two rollers 18a and 18b are slidably inserted over the two axles 16a and 16b. In one embodiment, rollers 18a and 18b may rotate on axles 16a and 16b, respectively. Rollers 18a and 18b provide resistance when the user bites thereon while exercising using mandibular advancement device 10. The user's teeth may glide on rollers 18a and 18b during use and rollers 18a and 18b may provide a slight roll.

Figure 3:
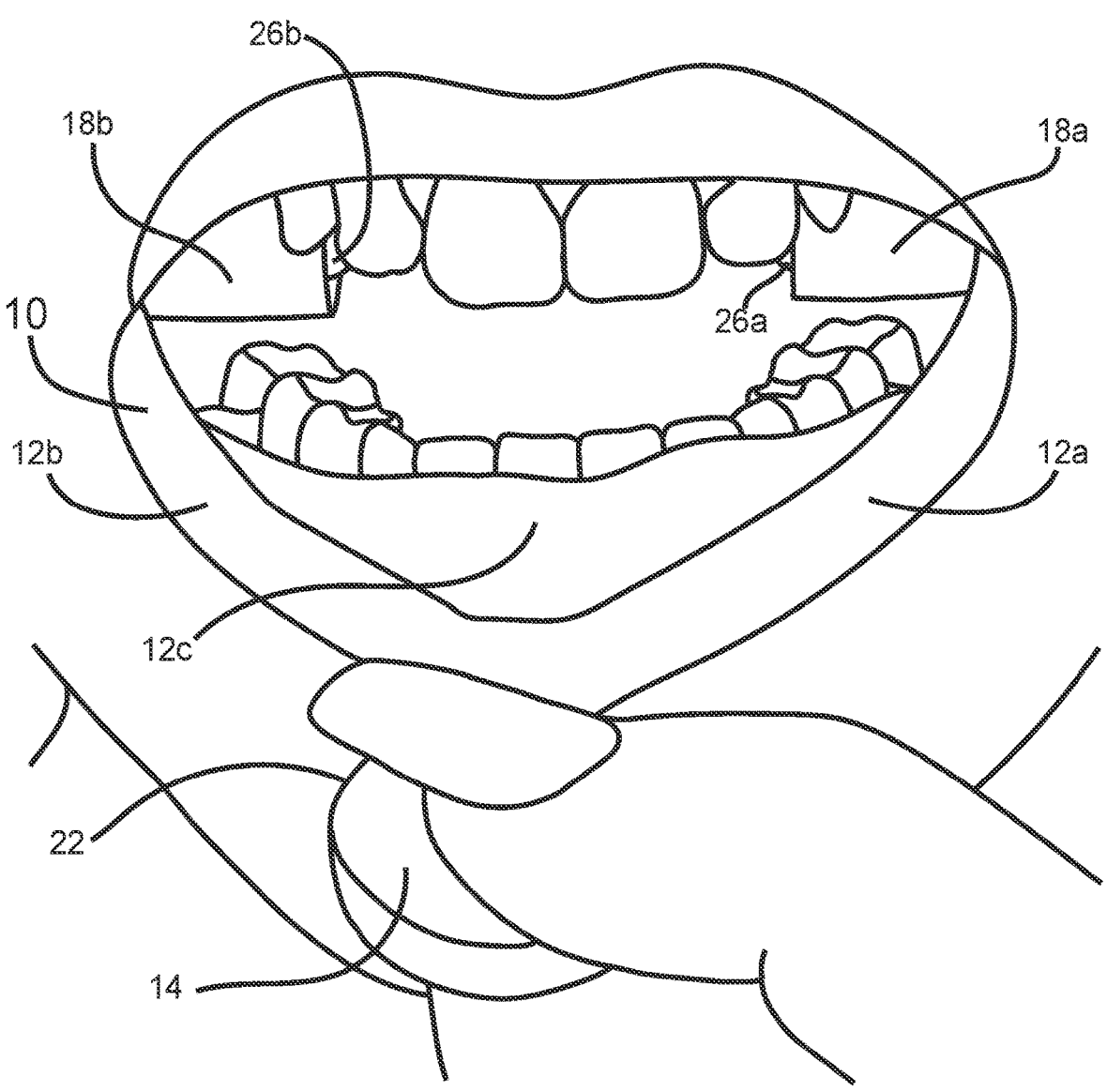
FIG. 3 illustrates a perspective view of the mandibular advancement device illustrated in FIGS. 1 and 2, wherein the mandibular advance device is inserted into a user's mouth.

As seen in FIG. 1, curved members 12a and 12b extend outwardly from the base portion 14 to provide a substantially arch-shaped mandibular advancement device 10, Device 10 exhibits an opening 12c between the two curved members 12a and 12b. Curved members 12a and 12b may be made from a variety of different types of materials, such polymers, plastics, thermoplastics, or the like. Curved members 12a and 12b may be bent slightly to be readily inserted into and removed from a user's mouth. This configuration of the design allows for the mandibular advancement device 10 to be comfortably placed and adjusted in correct positions in a user's mouth with respect to the user's teeth, as seen in FIG. 3. Also, the design of the mandibular advancement device 10 may accommodate users having mouths of various sizes and shapes.

One of ordinary skill in the art would understand that the curved members 12a and 12b and the mandibular advancement device 10, as a whole, may have other shapes and configurations in other embodiments. For example, versions of mandibular advancement devices may exist having smaller dimensions for users having smaller mouths, such as children.

Figure 4:
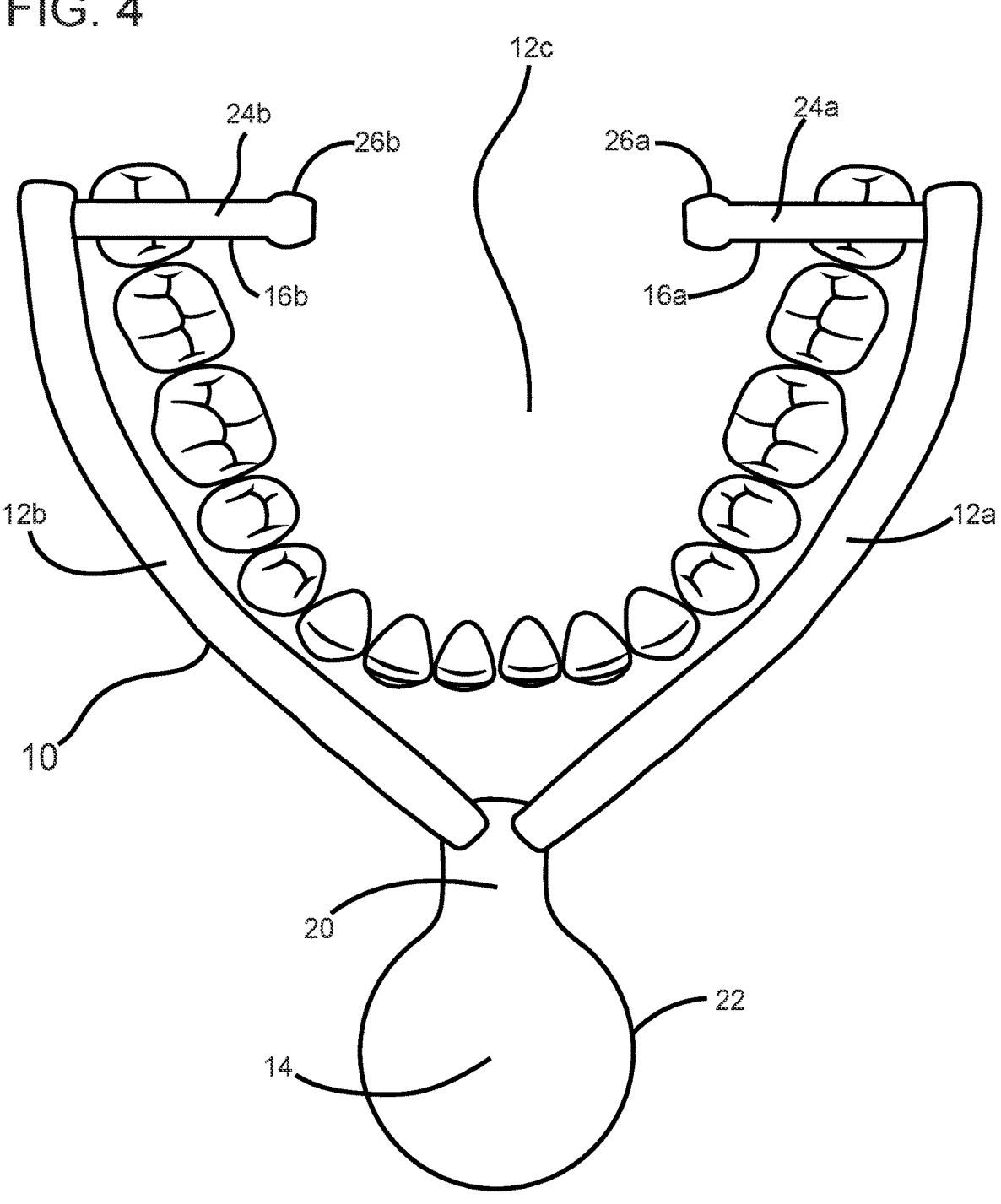
FIG. 4 illustrates a top plan view of the mandibular advancement device illustrated in FIGS. 1-3, wherein the mandibular advancement device does not require rollers.

As seen in FIG. 4, each of the curved members 12a and 12b is connected to the base portion 14 by neck portion 20, wherein the base portion 14 extends downward and away from the axles (bars) 16a and 16b. In this embodiment, the base portion 14 includes the neck portion 20 that is connected to the curved members 12a and 12b and a substantially circular portion 22 of the base portion. The substantially circular portion 22 allows a user to hold the mandibular advancement device 10 and to position and direct device 10 by hand within his/her mouth. In one embodiment, the base portion 14 is made from the same type(s) of materials as the curved members 12a and 12b. One of ordinary skill in the art would understand that the base portion 14 may have a variety of different shapes, sizes, and configurations.

In one embodiment seen most clearly in FIG. 4, the axles (bars) 16a and 16b are positioned at nearly the top of each of the curved members 12a and 12b, opposite the base portion 14. The axles (bars) 16a and 16b extend toward each other into the opening 12c defined by the curved members 12a and 12b such that the axles (bars) 16a and 16b are substantially perpendicular to the curved members 12a and 12b. Axles (bars) 16a and 16b include elongated portion 24a and 24b, respectively. Axles (bars) 16a and 16b also include rounded portions 26a and 26b, respectively, wherein the thickness of the rounded portions 24a and 24b is slightly greater than the thicknesses of the elongated portions 24a and 24b, respectively. As a result, the rollers 18a and 18b may be slidably inserted onto the axles (bars) 16a and 16b and be retained thereon by rounded portions 26a and 26b.

Figure 2A:
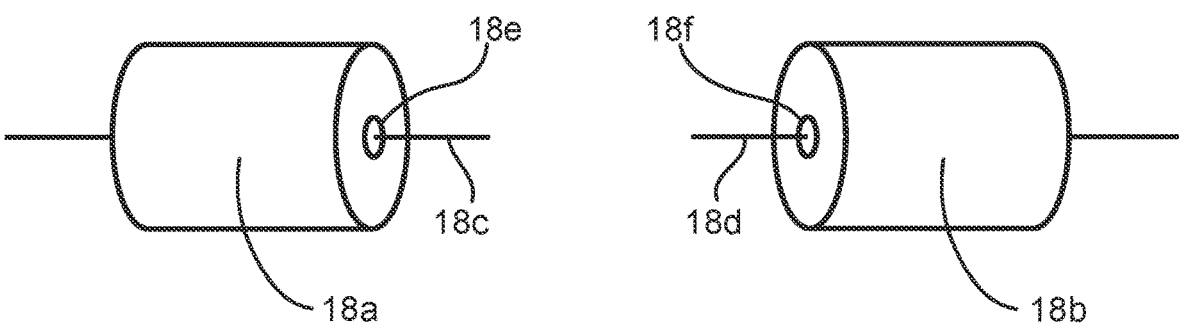
FIG. 2A illustrates a representative roller that the disclosed mandibular advancement device may employ.
Figure 2B:
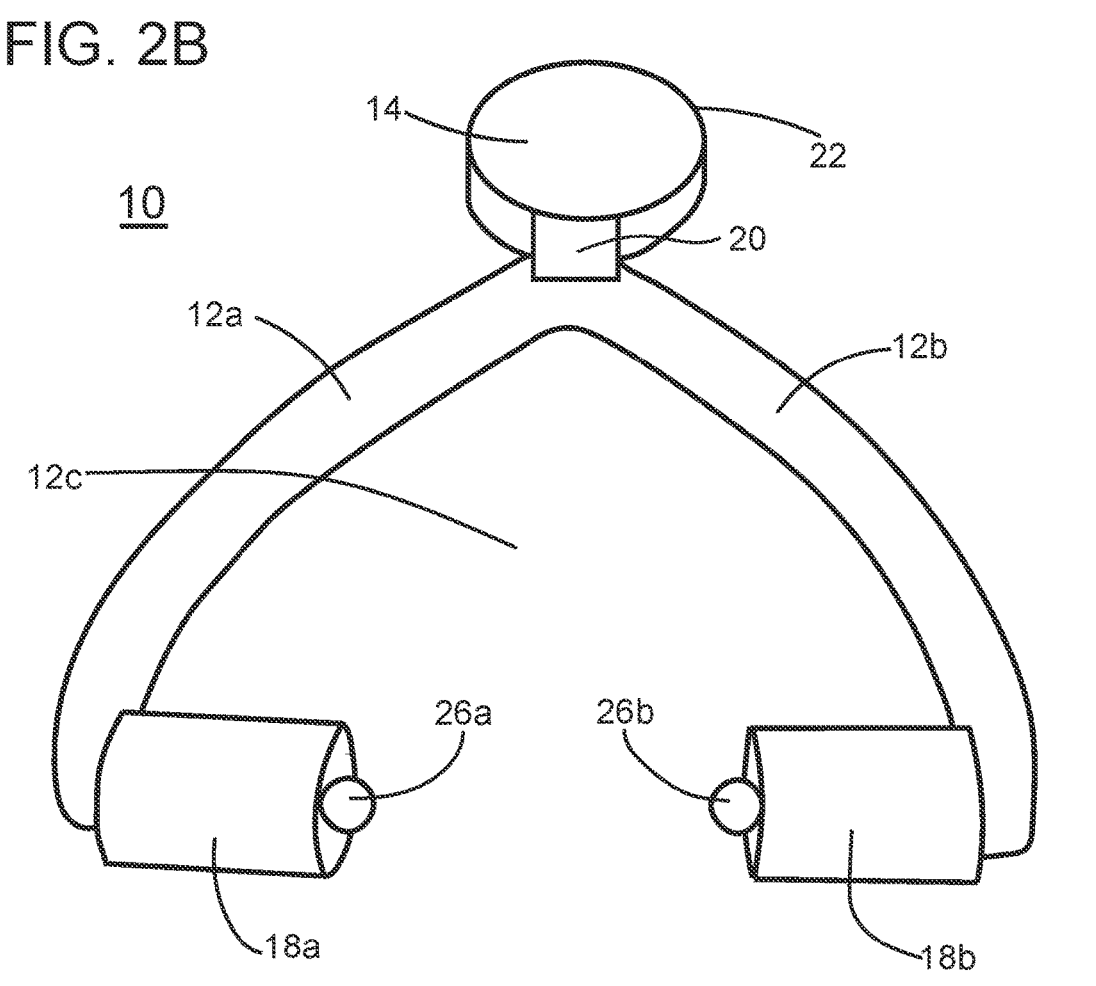
FIG. 2B illustrates another perspective view of the mandibular advancement device illustrated in FIG. 1.

FIG. 2A shows representative rollers 18a and 18b. Rollers 18a and 18b exhibit a cylindrical geometry and includes axes 18c and 18d, respectively. Rollers 18a and 18b also include central openings 18e and 18f, respectively, along axes 18c and 18d, respectively. FIG. 2B shows another perspective view of device 10 and includes base portion 14, curved members 12a and 12b, rollers 18a and 18b, and neck portion 20. Roller openings 18e and 18f exhibit a generally cylindrical shape and are sufficiently wide to receive axles (bars) 16a and 16b, respectively, therein.

More particularly, as seen in FIG. 4, the elongated portions 24a and 24b allow the rollers 18a and 18b, respectively, to slide and roll thereon, while the rounded portions 26a and 26b help prevent the rollers 18a and 18b from prematurely coming off the axles (bars) 16a and 16b. In other embodiments, there may only be one bar that extends from either one curved member or across both curved members. The length, shape, and thickness of the bars may vary in other embodiments.

As best seen in FIG. 4 and as a non-limiting example, the mandibular advancement device 10, without the rollers, may be integrally formed from the same material using a 3D printer. In another embodiment, the mandibular advancement device 10 may be made using multiple parts that are assembled/joined together.

In one embodiment, the rollers 18a and 18b may be made from a styrene copolymer, rubber, or the like. The material of the rollers 18a and 18b is safe for a user's teeth to bite and creates resistance when a user bites down. The rollers 18a and 18b may be about 15 mm in length to accommodate users with varying mouth and teeth sizes. In other embodiments, rollers may have different sizes, shapes, configurations, and materials so long as they are still configured to be safe for a user's mouth/teeth and create resistance when bitten by users.

In alternative embodiments, mandibular advancement devices may include exactly one roller or more than two rollers. In other alternative embodiments, rollers 18a and 18b may be formed integrally with axles (bars) 16a and 16b such that they are a single unit.

In operation, a user inserts the mandibular advancement device 10 into their mouth by holding the base portion 14 and positioning the rollers 18a and 18b over the desired teeth. The user's tongue can then freely move within the opening defined by the curved members 12a and 12b. Once the mandibular advancement device 10 is properly positioned in the user's mouth, the user bites down on rollers 18a and 18b to perform various types of exercises. Rollers 18a and 18b create resistance once the user bites down on device 10 with their teeth. The mandibular advancement device 10 allows the user to build and strengthen their jaw muscles and muscles of mastication while ensuring that their bite does not change and their temporal mandibular joint is reset.

In a first example, a user positions the rollers 18a and 18b between their rearmost upper and lower teeth and gently bites down on the rollers 18a and 18b a predefined amount of times, such as about 30 times. The rearmost teeth may vary from one user to another, and may be molars in some examples. This exercises helps build and strengthen a user's masseter muscle, which is located in the posterior parts of the cheek and is one of the muscles responsible for the action of mastication (chewing and biting). When the masseter muscle contracts, it causes powerful elevation of the mandible causing the mouth to close. Users often experience relaxing of the jaw shortly after performing this exercise with the mandibular advancement device 10.

In a second example, a user positions the rollers 18a and 18b between their upper and lower premolars (or behind their canine teeth). With some pressure, the user rolls their jaw forward and then back to their natural bite position while exerting some pressure/force on the rollers 18a and 18b for a predefined amount of times, such as about 30 times. This exercise helps build and strengthen a user's lateral pterygoid muscle, which is located on the infratemporal fossa of the skull and is also one of the muscles responsible for the action of mastication (chewing and biting).

In a third example, a user positions the rollers 18a and 18b between their upper and lower premolars (or behind their canine teeth). The user then slightly points their chin upwards and rolls their jaw forward and back to their natural bite position while exerting some pressure/force on the rollers 18a and 18b for a predefined amount of times, such as about 30 times. This exercise helps build and strengthen a user's genioglossus muscle, which attaches to the tongue and moves the tongue. The user's tongue tightens when performing this exercise. This exercise also helps tighten the airway and help get rid of a user's double chin, while resulting in a more flexible jaw.

Some or all of the exercises disclosed herein may be performed and these exercises may be formed in any order using the mandibular advancement device 10. In other embodiments, other types of exercises may also be performed using the mandibular advancement device 10.

Some of the significant benefits of the present disclosure include providing a user-friendly, comfortable, and customizable mandibular advancement device that strengthens a user's jaw and improves chewing and biting function. The mandibular advancement device disclosed herein ameliorates pain, discomfort, and snoring, while ensuring that a user's bite does not change.

It is to be understood that the various embodiments described in this specification and as illustrated in the attached drawings are simply exemplary embodiments illustrating the inventive concepts as defined in the claims. As a result, it is to be understood that the various embodiments described and illustrated may be combined to from the inventive concepts defined in the appended claims.

In accordance with the provisions of the patent statutes, the present disclosure has been described to represent what is considered to represent the preferred embodiments. However, it should be noted that this disclosure can be practiced in other ways than those specifically illustrated and described without departing from the spirit or scope of this disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be also understand that the terms "including" and "having" are synonymous.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Process steps may be performed in an order different than those presented for purposes of example. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A mandibular advancement device comprising:

a base portion;

first and second curved members extending outwardly from the base portion to form first and second ends of the first and second curved members, respectively;

first and second axles that extend inwardly from the first and second ends of the first and second curved members, respectively; and

first and second rollers that slidably engage the first and second axles.

2. The mandibular advancement device of claim 1, wherein the first and second axles include respective elongated portions extending from the first and second ends of the first and second curved members inward to first and second rounded portions, respectively.

3. The mandibular advancement device of claim 2, wherein the first and second rollers are slidably mounted on the first and second axles, wherein the first and second rounded portions assist in retaining the first and second rollers on the first and second axles.

4. The mandibular advancement device of claim 2, wherein the base portion includes a substantially circular portion.

5. The mandibular advancement device of claim 1, wherein the first and second axles are substantially aligned on a common axis.

6. The mandibular advancement device of claim 1, wherein the first and second curved members exhibit a substantially arch-type geometry.

7. The mandibular advancement device of claim 1, wherein the first and second curved members exhibit a substantially wishbone-type geometry.

8. The mandibular advancement device of claim 1, further comprising a neck portion extending from the base portion to a common end of the first and second curved members.

9. The mandibular advancement device of claim 1, wherein the first and second curved members form an opening therebetween.

10. A mandibular advancement device comprising:

a base portion;

first and second curved members extending outwardly from the base portion to form first and second ends of the first and second curved members, respectively;

first and second axles that extend inwardly from the first and second ends of the first and second curved members, respectively; and first and second rollers integrally formed as part of the first and second axles.

11. The mandibular advancement device of claim 10, wherein the first and second axles are substantially aligned on a common axis.

12. The mandibular advancement device of claim 10, wherein the first and second curved members exhibit a substantially arch-type geometry.

13. The mandibular advancement device of claim 10, wherein the first and second curved members exhibit a substantially wishbone-type geometry.

14. The mandibular advancement device of claim 10, wherein the first and second axles include respective elongated portions extending from the first and second ends of the first and second curved members inward to first and second rounded portions, respectively.

15. A mandibular advancement device comprising:

a base portion;

first and second curved members extending outwardly from the base portion to form first and second ends of the first and second curved members, respectively;

first and second axles that extend inwardly from the first and second ends of the first and second curved members, respectively;

first and second rollers that slidably engage the first and end second axles;

wherein the first and second axles are substantially aligned on a common axis;

wherein the first and second curved members exhibit one of a substantially arch-type geometry and a substantially wishbone-type geometry;

wherein the first and second axles include respective elongated portions extending from the first and second ends of the first and second curved members inward to first and second rounded portions, respectively;

wherein the first and second rounded portions are configured to assist in retaining the first and second rollers on the first and second axles;

a neck portion extending from the base portion to adjacent ends of the first and second curved members;

wherein the base portion includes a substantially circular portion; and wherein the first and second curved members form an opening therebetween.

* * * * *